March 19, 1935.  R. K. LEE  1,995,031
AUTOMOTIVE VEHICLE
Filed April 5, 1933
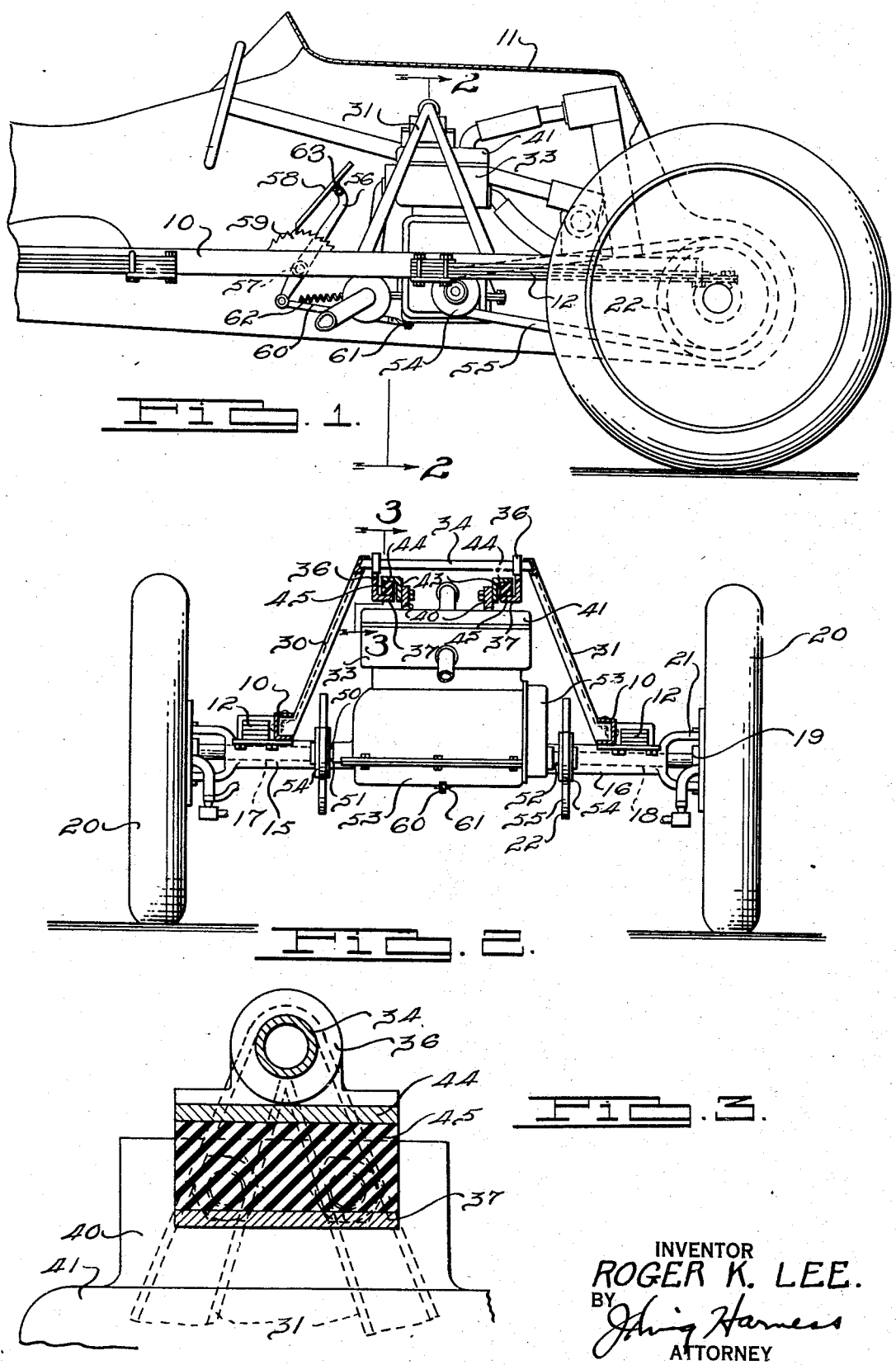
INVENTOR
ROGER K. LEE.
BY
Irving Harness
ATTORNEY Patented Mar. 19, 1935

1,995,031

UNITED STATES PATENT OFFICE 1,995,031

AUTOMOTIVE VEHICLE

Roger K. Lee, Highland Park, Mich., assignor to Chrysler Corporation, Detroit, Mich., a corporation of Delaware Application April 5, 1933, Serial No. 664,488

5 Claims. (Cl. 180—72)

This invention relates to automotive vehicles and more especially to the arrangement of the motor and the construction and arrangement of the driving connection between such motor and the power driven wheels of the vehicle. Constructions in accordance with this invention are especially adapted for use in conjunction with light weight automotive vehicles although not limited to such use.

The principal object of the invention is to improve the construction and control of the means for transmitting power to the driven wheels of an automotive vehicle.

Another object is to provide an extremely light weight and efficient drive connection between the power driven wheels and the motor of an automobile.

Another object is to provide an improved arrangement for releasably connecting the motor and drive wheels of an automobile in operative relation.

A further object of the invention resides in the provision of a drive connection which also serves the purpose of a clutch mechanism.

A further object is to provide a simple and efficient means for controlling the transmission of power from a motor to the wheels of an automobile.

Other objects and advantages will become apparent from the following description and appended claims.

For the purpose of illustrating the genus of the invention, a typical concrete embodiment is shown in the accompanying drawing, in which:

Figure 1 is a diagrammatic side elevation of the front portion of an automotive vehicle embodying a power transmitting system according to the present invention;

Fig. 2 is a section taken on the line 2—2 of Fig. 1, and

Fig. 3 is an enlarged section taken on the line 3—3 of Fig. 2.

Referring to the drawing, the numeral 10 designates the side sills of the frame of an automotive vehicle on which is secured a body indicated generally at 11. A pair of springs 12 are each secured at one end thereof to the sills 10, and at the other ends are secured to tubular axle members 15 and 16. The axle members 15 and 16 have journaled therein a pair of drive shafts 17 and 18, each provided with a universal joint 19 adjacent the king pin pivot of the wheel spindles for permitting steering of the wheels 20 of the vehicle. The outer ends of the axle members 15 and 16 terminate in yoke members 21 which yokes, in turn, terminate in the king pin pivots for the wheels 20. The shafts 17 and 18 are rotatable independently of one another and each is provided with a pulley 22 secured thereto.

A pair of standards 30 and 31 of inverted V-formation are secured at the lower ends to the sills 10 and are inclined upwardly and inwardly with respect to the frame to a height somewhat greater than the height of the engine 33. A beam 34 extends between the upper ends of the standards 30 and 31. The beam 34 is rigidly secured to the upper ends of the standards 30 and 31 and adjacent the point of connection of the beam to the standards, a pair of support members 36 are disposed, each being provided with a laterally disposed flange 37. A pair of lug members 40 are rigidly secured to or made integral with the head 41 of the engine 33 and to these lug members are secured a pair of supports 43 each being provided with a laterally disposed flange 44. The spacing of the lug members 40 on the cylinder head 41 of engine 33 and of the support members 36 on the beam member 34 are such that the laterally disposed flanges 37 on the support members 36 and the laterally disposed flanges 44 on the support members 43 at each end of the beam 34 are in vertical alignment. Blocks 45, of rubber or other desired yieldable material, are interposed between the flanges 37 and 44, the blocks being secured to the flanges 37 and 44.

The engine 33 is arranged transversely of the frame of the automotive vehicle and the yieldable blocks 45 provide pivot means which permit a certain amount of swinging movement of the engine 33 about an axis transverse to the frame of the vehicle. The blocks 45 are secured to the laterally disposed flanges 37 and 44, preferably by vulcanizing or otherwise bonding the material of the blocks to the flanges. The engine 33 is provided with a crank shaft 50 extending transversely of the frame of the vehicle and the ends 51 and 52 of the crank shaft extend beyond the crank case 53 of the engine. A pulley 54 is fixed to each of the ends 51 and 52 of the crank shaft of the engine. Belt means 55, preferably in the form of V belts, extend between the pulleys 54 on the crank shaft 50 and the pulleys 22 on the drive shafts 17 and 18 of the axle assembly. Since the shafts 17 and 18 are independently rotatable, relative rotation of wheels 22 may be obtained by slipping or yielding of the belts 55.

Means are provided for swinging the engine 33 relative to the vehicle frame, by virtue of the provision of the yieldable connection between the supports 36 and 43, which means may consist in a pedal lever 56 pivoted at a point 57, intermediate its length, to the frame of the vehicle and provided with a pedal pad and dogging member 58 engageable with a ratchet segment 59 for locking the lever 56 in the desired adjusted position in one direction, the other end of the lever 56 being connected by a link 60 to a lug member 61 secured approximately centrally to the rear bottom margin of the crank case 53 of engine 33.

A spring 62 may be provided for normally retracting the pedal lever 56 when the dog 58 is disengaged from the segment 59 and for swinging the engine 33 to a forward position to disconnect the drive from the engine to the wheels of the vehicle.

In the operation of the device, power derived from the engine 33 is transmitted by the crank shaft 50 to the pulleys 54 secured thereon and through the V belt means 55 to the pulleys 22 fixed to the drive shafts 17 and 18. These shafts are journaled in the axle members 15 and 16 and connected through universal joints 19 to the wheels 20 of the automotive vehicle. The belts 55 not only serve to transmit power from the engine to the vehicle but also afford means for releasably completing the drive connection between the engine and the wheels of the vehicle. This drive connection is completed when the bottom of the engine 33 is swung rearwardly or in a clockwise direction as viewed in Fig. 1 about the yieldable block members 45 so as to tension the belt member 55 and bring the same into sufficient frictional engagement with the pulleys 54 and 22 to complete the drive connection. The engine 33 is swung rearwardly, as previously indicated, by forcing the pedal pad 58 forwardly of the vehicle, thus rotating the pedal lever 56 in a clockwise direction about the pivot 57, as viewed in Fig. 1, and moving the tie rod 60 rearwardly to swing the lower portion of the engine 33 and the pulleys 54 mounted on the crank shaft 50 in a rearward direction to tension the belts 55. The pedal pad 58 extends in both directions from its pivotal connection, designated 63, to the pedal lever 56 so that the pedal pad may be controlled by heel and toe movement to lock the pedal lever 56 in position by bringing the pedal pad 58 into engagement with the ratchet segment 59 or to release the pedal lever 56 to sever the drive connection between the engine and the wheels 20.

It will be noted that the standards 30 and 31 and the beam member 34 constitute an arch-like support member which constitutes the sole means for supporting the engine 38 relative to the frame of the vehicle. It will also be noted that the yieldable blocks 45, in conjunction with the support members 36 and 43, not only provide a pivotal means for permitting swinging movement of the engine so as to complete or sever the drive connection between the engine and the wheels, but also provides a yieldable mounting means for the engine so as to dampen vibrations and prevent their transmission to the frame of the vehicle.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a motor vehicle, the combination of a frame, a pair of upwardly and inwardly inclined standards secured to said frame, a beam connecting the upper ends of said standards, a pair of supports depending from said beam adjacent the ends thereof, a laterally directed flange on each support, an engine, a pair of supports secured to the upper portion of said engine, a laterally directed flange on each of said last-named supports adapted to overlie one of the laterally directed flanges on said first-named supports, a block of resilient material interposed between each pair of superposed flanges and secured to the flanges thereof, a wheel and axle assembly secured to said frame, drive means on the lower portion of said engine, drive means for said wheels mounted on said axle, a drive connection between said drive means including clutch means operable in response to movement of said engine, and means for swinging said engine about the connection between said supports to connect and disconnect said engine and said wheels.

2. In a motor vehicle, the combination of a frame structure, a pair of spaced driving wheels, an internal combustion engine having a pair of driving members adapted to be drivingly connected with said wheels, means for connecting each of said members with one of said wheels respectively, resilient mounting members interposed between said frame structure and engine for oscillatively supporting the latter about an axis to accommodate movement of said engine and its driving members relative to said driving wheels for varying the tension of said connecting means, said mounting members being so constructed and arranged as to accommodate limited twisting of said engine about another axis for equalizing the tension on said connecting means.

3. In a motor vehicle, the combination of a frame structure, a pair of spaced driving wheels, an internal combustion engine having a pair of driving members adapted to be drivingly connected with said wheels, means for connecting each of said members with one of said wheels respectively, resilient mounting members interposed between said frame structure and engine for oscillatively supporting the latter about an axis to accommodate movement of said engine and its driving members relative to said driving wheels for varying the tension of said connecting means, said mounting members being so constructed and arranged as to accommodate limited twisting of said engine about another axis for equalizing the tension on said connecting means, and means including a single connection between said frame structure and said engine for urging the latter in one direction about said first mentioned axis to vary the tension on said connecting means.

4. In a motor vehicle, the combination of a frame, a pair of spaced driving wheels, an internal combustion engine including a crank shaft having projecting ends extending beyond the body of said engine, a driving element secured on the opposite ends of said crank shaft and adapted to be drivingly connected with said wheels, means including an endless driving member for connecting each of said driving elements with one of said wheels respectively, an engine mounting including a rigid support carried by said frame and spaced rubber blocks fixed to said support and engine respectively for oscillatively supporting the latter in suspended relation about an axis above the elevation of said endless driving members, said mounting being so constructed and arranged as to accommodate limited twisting of said engine about another axis for equalizing the tension on said endless driving members.

5. In a motor vehicle, the combination of a frame structure, a pair of steerable wheels pivotally and rotatably mounted on said frame structure, a pair of independently rotatable shafts carried by said frame structure, a universal joint connecting each of said shafts with one of said wheels respectively, a driving member on each shaft, an internal combustion engine having a pair of driving members, one aligned with and adapted to be drivingly connected with each of the driving members of said shafts respectively, means forming a driving connection between each aligned pair of driving members respectively, steering mechanism for said wheels, and rubber mounting members interposed between said frame structure and engine for oscillatively supporting the latter about an axis to accommodate movement of said engine and its driving members relative to said wheels for varying the tension of said driving connection, said mounting members being so constructed and arranged as to accommodate limited twisting of said engine about another axis for equalizing the tension on said driving connection.

ROGER K. LEE.